United States Patent
Westrick, Jr. et al.

(10) Patent No.: US 10,728,987 B1
(45) Date of Patent: Jul. 28, 2020

(54) DISTRIBUTED OCCUPANCY-TRACKING LIGHTING CONTROL SYSTEM

(71) Applicant: ABL IP Holding LLC, Atlanta, GA (US)

(72) Inventors: Richard Lee Westrick, Jr., Social Circle, GA (US); Januk Swarup Aggarwal, Alexandria, VA (US); Nathaniel Christopher Herwig, Lawrenceville, GA (US)

(73) Assignee: ABL IP Holding LLC, Atlanta, GA (US)

(*) Notice: Subject to any disclaimer, the term of this patent is extended or adjusted under 35 U.S.C. 154(b) by 0 days.

(21) Appl. No.: 16/378,002

(22) Filed: Apr. 8, 2019

(51) Int. Cl.
  *H05B 47/105* (2020.01)
  *H05B 47/12* (2020.01)
  *H05B 47/19* (2020.01)

(52) U.S. Cl.
  CPC .......... *H05B 47/105* (2020.01); *H05B 47/12* (2020.01); *H05B 47/19* (2020.01)

(58) Field of Classification Search
  CPC ............ H05B 37/0272; H05B 37/0218; H05B 37/0227; H05B 37/023
  USPC ........................................... 315/150–158, 29
  See application file for complete search history.

(56) References Cited

U.S. PATENT DOCUMENTS

| | | | | |
|---|---|---|---|---|
| 2012/0306377 A1* | 12/2012 | Igaki | ................... | F21V 23/0464 315/151 |
| 2012/0306382 A1* | 12/2012 | Maxik | ...................... | F21S 2/00 315/152 |
| 2017/0288774 A1* | 10/2017 | Ryan | .................... | H04B 10/116 |
| 2018/0070426 A1* | 3/2018 | Chen | ................. | H05B 37/0227 |

\* cited by examiner

*Primary Examiner* — Dedei K Hammond
*Assistant Examiner* — Amy X Yang
(74) *Attorney, Agent, or Firm* — Kilpatrick Townsend & Stockton LLP

(57) ABSTRACT

A distributed lighting control system has a plurality of independently controlled light fixtures. Each light fixture of the plurality of independently controlled light fixtures includes: an illuminating element; driver circuitry operatively coupled to the illuminating element and configured to provide power to the illuminating element; one or more sensors; and a processor operatively coupled to the one or more sensors and the driver circuitry. The processor is configured to: receive signals from the one or more sensors; and control the driver circuitry to provide power to the illuminating element to generate illumination based on the received signals from the one or more sensors. Illumination provided by each light fixture of the plurality of independently controlled light fixtures is controlled independently of the illumination provided by others of the plurality of independently controlled light fixtures.

23 Claims, 7 Drawing Sheets

DISTRIBUTED OCCUPANCY-TRACKING LIGHTING CONTROL SYSTEM

BACKGROUND

Unless otherwise indicated herein, the materials described in this section are not prior art to the claims in this application and are not admitted to be prior art by inclusion in this section.

In certain situations, the typical method of detecting occupancy status and turning light fixtures on/off or changing their dim levels might be distracting or inappropriate. For example, in a small conference room or office, all lights should react to a person entering the space. In a large, open office space with many light fixtures, however, all of the light fixtures do not need to turn on for a single person working in one corner of the area in an otherwise unoccupied space.

Some methods of detecting occupancy and controlling lights employ a complex, centrally controlled system which tracks the position of an occupant using one or more PIR sensors, and adjusts the intensity of selected nearby fixtures to "follow" that occupant with a moving zone of light. While this is a viable approach, it has the drawbacks of complexity and high cost.

SUMMARY

Systems and methods for providing distributed lighting control are provided.

According to various aspects there is provided a distributed lighting control system. In some aspects, the system may include a plurality of independently controlled light fixtures. Each light fixture of the plurality of independently controlled light fixtures may include: an illuminating element; driver circuitry operatively coupled to the illuminating element and configured to provide power to the illuminating element; one or more sensors; and a processor operatively coupled to the one or more sensors and the driver circuitry. The processor may be configured to: receive signals from the one or more sensors; and control the driver circuitry to provide power to the illuminating element to generate illumination based on the received signals from the one or more sensors. Illumination provided by each light fixture of the plurality of independently controlled light fixtures may be controlled independently of the illumination provided by others of the plurality of independently controlled light fixtures.

A plurality of different levels of illumination may be simultaneously provided by a plurality of subsets of light fixtures in the plurality of independently controlled light fixtures based on a sensed proximity of an occupant to each of the plurality of subsets of light fixtures. The plurality of different levels of illumination may provide changing illumination as the occupant is sensed at further proximities with respect to each of the subsets of light fixtures by the one or more sensors of each of the plurality of independently controlled light fixtures in each of the subsets of light fixtures.

The one or more sensors of each light fixture may be configured to sense a proximity of an occupant to the light fixture, and the processor of the light fixture may be configured to determine a range of the occupant with respect to the light fixture. The processor of the light fixture may be configured to control the driver circuitry to provide power to the illuminating element to generate illumination based on the determined range of the occupant with respect to the light fixture based on received signals from the one or more sensors.

The processor of the light fixture may be configured to control the driver circuitry to provide power to the illuminating element to generate illumination based on the determined range of the occupant with respect to the light fixture. The processor of the light fixture may configured to control the driver circuitry to provide power to the illuminating element to generate a first illumination having a first intensity when the occupant is determined to be at a first proximity with respect to the light fixture, and to generate a second illumination having a second intensity less bright than the first intensity when the occupant is determined to be at a second proximity further than the first proximity with respect to the light fixture. The processor may be configured to provide a plurality of illumination intensity levels between a highest intensity level and a lowest intensity level, where the plurality of illumination intensity levels may correspond to a plurality of proximities of the occupant sensed by the one or more sensors of the light fixture.

The processor of the light fixture may be configured to change an intensity of illumination provided by the illuminating element as a proximity of the occupant to the light fixture changes by controlling the driver circuitry to change the power provided to the illuminating element.

The one or more sensors may be at least one of an infrared (IR) sensor, an ultrasonic sensor, an audio sensor array, a radar sensors, a "time of flight" sensor, a distance-based photoelectric sensor, a radio frequency identification (RFID) tag reader, and a near field communication (NFC) tag reader an ultra-wideband (UWB) radio, a Bluetooth® radio and a Wi-Fi® radio. The Bluetooth® radio, UWB) radio, or the Wi-Fi® radio may be configured to detect a signal from a mobile device carried by the occupant, and a proximity of the occupant may be sensed based on a detected signal from the mobile device.

The processor in each light fixture of the plurality of independently controlled light fixtures may be configured to control the driver circuitry to provide power to the illuminating element such that intensity of the illumination provided by each light fixture of the plurality of independently controlled light fixtures decreases as a proximity of the occupant to each light fixture sensed by the one or more sensors of each light fixture increases.

The processor of each light fixture of the plurality of independently controlled light fixtures may be configured to: determine that the occupant within a first proximity of the light fixture is within a first range based on the signals received by the one or more sensors of the light fixture; determine that the first range of the occupant is further from the light fixture than a second range closer to the light fixture than the first range at which the processor causes an intensity of the illumination to increase from a first intensity to a second intensity; and illuminate the light fixture at the first intensity based on the determined first range of the occupant.

According to various aspects there is provided a method for providing distributed lighting control with a plurality of independently controlled light fixtures. In some aspects, the method may include: receiving signals from one or more sensors of a light fixture of the independently controlled light fixtures; and providing power to an illuminating element of the light fixture by controlling driver circuitry of the light fixture via a processor of the light fixture to generate illumination based on the received signals from the one or more sensors. Illumination provided by each light fixture of the plurality of independently controlled light fixtures may be controlled independently of the illumination provided by other light fixtures of the plurality of independently controlled light fixtures.

A plurality of different levels of illumination may be simultaneously provided by a plurality of subsets of light fixtures in the plurality of independently controlled light fixtures based on a sensed proximity of an occupant to each of the plurality of subsets of light fixtures. The plurality of different levels of illumination may provide changing illumination as the occupant is sensed at further proximities with respect to each of the subsets of light fixtures by the one or more sensors of each of the plurality of independently controlled light fixtures in each of the subsets of light fixtures.

The method may further include sensing a proximity of the occupant to each light fixture of the plurality of independently controlled light fixtures via one or more sensors of each light fixture, determining, by a processor of each light fixture, a range of the occupant with respect to the light fixture based on received signals from the one or more sensors, and generating illumination by each light fixture of the plurality of independently controlled light fixtures based on the determined range of the occupant with respect to each light fixture by controlling, via the processor of each light fixture, driver circuitry of each light fixture to provide power to an illuminating element of each light fixture.

The method may further include generating illumination by each light fixture of the plurality of independently controlled light fixtures based on a proximity of the occupant to each light fixture by controlling driver circuitry of each light fixture, via a processor of each light fixture, to provide power to an illuminating element of each light fixture; generating a first illumination having a first intensity when the occupant is determined to be at a first proximity with respect to the light fixture; generating a second illumination having a second intensity less bright than the first intensity when the occupant is determined to be at a second proximity further than the first proximity with respect to the light fixture, and providing a plurality of illumination intensity levels between a highest intensity level and a lowest intensity level, the plurality of illumination intensity levels corresponding to a plurality of proximities of the occupant sensed by the one or more sensors of the light fixture.

The method may further include changing a intensity of illumination provided by the illuminating element of the light fixture as a proximity of the occupant to the light fixture changes by controlling the driver circuitry of the light fixture via the processor of the light fixture to change the power provided to the illuminating element.

The one or more sensors may include at least one of an infrared (IR) sensor, an ultrasonic sensor, an audio sensor array, a radar sensor, a "time of flight" sensor, a distance-based photoelectric sensor, a radio frequency identification (RFID) tag reader, and a near field communication (NFC) tag reader.

The method may further include detecting a signal via a Bluetooth radio, an ultra-wideband (UWB) radio, or a Wi-Fi® radio from a mobile device carried by the occupant, and sensing a proximity of the occupant from each of the plurality of independently controlled light fixtures based on detecting the signal from the mobile device.

The method may further include controlling driver circuitry of each light fixture of the plurality of independently controlled light fixtures, via a processor of each light fixture, to provide power to an illuminating element of each light fixture such that intensity of the illumination provided by each light fixture of the plurality of independently controlled light fixtures decreases as a proximity of the occupant to each light fixture sensed by one or more sensors of each light fixture increases.

The method may further include determining, via the processor of the light fixture of the plurality of independently controlled light fixtures, based on the signals received by the one or more sensors of the light fixture, that the occupant is within a first proximity of the light fixture is within a first range; determining, via the processor, that the first range of the occupant is further from the light fixture than a second range closer to the light fixture than the first range at which the processor causes an intensity of the illumination to increase from a first intensity to a second intensity; and illuminating the light fixture at the first intensity based on the determined first range of the occupant.

According to various aspects there is provided a lighting system having distributed control. In some aspects, the lighting system may include a plurality of independently controlled light fixtures. Each light fixture of the plurality of independently controlled light fixtures may include: an illuminating element; driver circuitry operatively coupled to the illuminating element and configured to provide power to the illuminating element; one or more sensors; and a processor operatively coupled to the one or more sensors and the driver circuitry. The processor may be configured to: receive signals from the one or more sensors; and control the driver circuitry to provide power to the illuminating element to generate one or more lighting characteristics based on the received signals from the one or more sensors. The one or more lighting characteristics provided by each light fixture of the plurality of independently controlled light fixtures may be controlled independently of the one or more lighting characteristics provided by others of the plurality of independently controlled light fixtures.

The one or more lighting characteristics may be simultaneously provided by a plurality of subsets of light fixtures in the plurality of independently controlled light fixtures based on a sensed proximity of an occupant to each of the plurality of subsets of light fixtures. Varying degrees of the one or more lighting characteristics may provide changing illumination as the occupant is sensed at further proximities with respect to each of the subsets of light fixtures by the one or more sensors of each of the plurality of independently controlled light fixtures in each of the subsets of light fixtures.

The one or more sensors of each light fixture may be configured to sense a proximity of an occupant to the light fixture, and the processor of the light fixture may be configured to determine a range of the occupant with respect to the light fixture based on received signals from the one or more sensors. The processor of the light fixture may be configured to control the driver circuitry to provide power to the illuminating element to generate the one or more lighting characteristics based on the determined range of the occupant with respect to the light fixture.

Numerous benefits are achieved by way of the various embodiments over conventional techniques. For example, the various embodiments provide systems and methods that can be used to circumvent basic limits imposed by complex, centrally controlled lighting systems. In some embodiments, distributed control of independent light fixtures eliminates the need for central controller, eases installation, and provides more granular control of light fixtures. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

In accordance with various aspects of the present disclosure, autonomous systems and methods to achieve precise lighting control without programming complex lighting control profiles and without a central control system are provided. Embodiments in accordance with the present disclosure may provide real-time, distributed control of lighting, either at the light fixture level or within a small, localized network of sensors and light fixtures. One or more sensors disposed adjacent to a light fixture, embedded inside the light fixture, disposed remotely from the light fixture, or a combination thereof, may detect the distance between the light fixture and an occupant and determine an appropriate intensity level or other lighting characteristics. In some cases, light fixtures or sensors may already have internal passive infrared (PIR) sensors capable of detecting occupancy and proximity that may be updated to add functionality with a firmware update. Various embodiments may be implemented both with inexpensive existing sensor technologies or with more capable sensor technologies.

The distributed control system provided by embodiments of the present disclosure provides the added benefit of increased security by making the lighting system less susceptible to disruption from network based threats, e.g., hacking, denial of service attacks, faults in other devices, etc. In addition, distributed control of light fixtures to provide only the illumination needed in areas where the illumination is needed may benefit energy management. For example, controlling light fixtures to provide high illumination only in areas where needed while reducing or extinguishing illumination in surrounding areas may reduce the cost of energy required to operate the light fixtures.

The various aspects may provide operational and aesthetically pleasing lighting changes, finer "resolution" of lighting control thereby eliminating the need for large numbers of lighting zones or complex lighting profiles, and the elimination of the need for a central controller. As used herein, the term "operational lighting" refers to lighting having a primary function of increasing visibility for an occupant, for example, in a work space or other indoor space, along a walkway or other outdoor space, etc. In accordance with various aspects of the present disclosure, some embodiments may be implemented in firmware, enabling product upgrades and lowering overall system cost.

Figure 1:
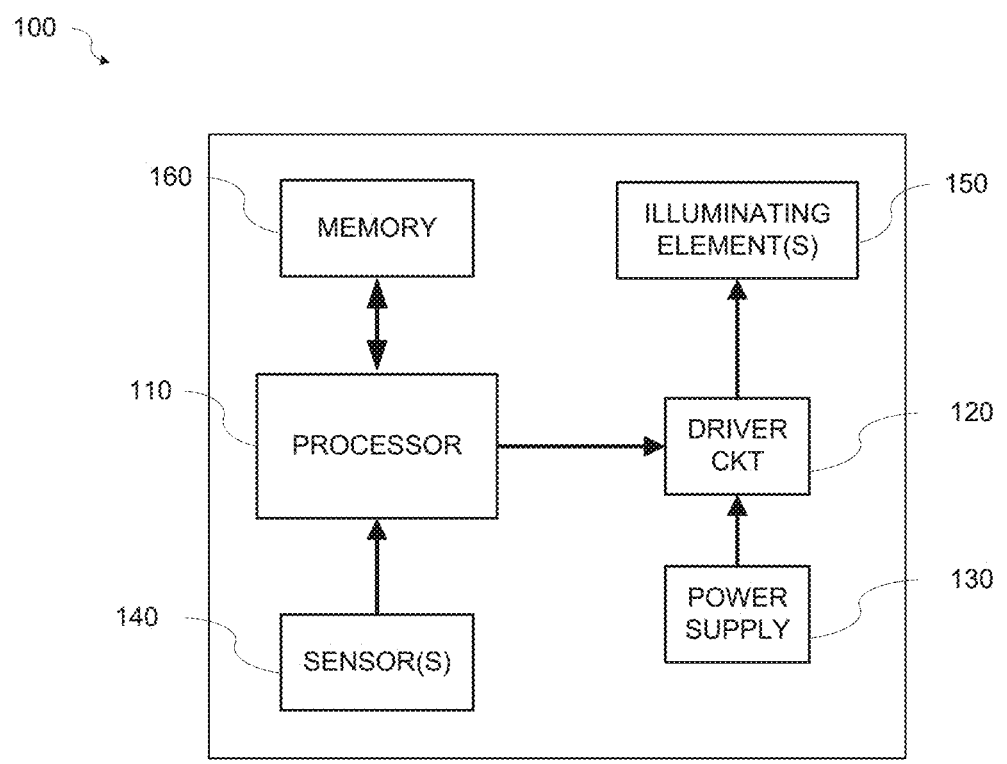
FIG. 1 is a block diagram of a light fixture according to various aspects of the present disclosure.

FIG. 1 is a block diagram of a light fixture 100 according to various aspects of the present disclosure. Referring to FIG. 1, the light fixture 100 may include a processor 110, driver circuitry 120, a power source 130, one or more sensors 140, one or more illuminating elements 150, and a memory 160. The processor 110 may be a microprocessor, microcomputer, computer, microcontroller, programmable controller, or other programmable device. The processor 110 may control overall operation of the light fixture 100. The memory 160 may be processor-readable solid state storage media, for example, but not limited to, RAM, ROM, EEPROM, FLASH memory, or other solid state storage devices that may be used to store desired program code in the form of instructions or data structures and that may be accessed by and/or operated upon by the processor 110.

The power source 130 may supply power for the illuminating element 150. The driver circuitry 120 may control the power provided to the illuminating element 150 from the power source 130. Based on instructions received from the processor 110, the driver circuitry 120 may control, for example, but not limited to, intensity, color temperature, color of light, or other lighting characteristic, emitted from the illuminating element 150. The illuminating element 150 may be a light-emitting diode (LED), organic LED (OLED), a tunable fluorescent lamp, and/or other light emitting device(s).

The one or more sensors 140 may sense the distance (i.e., range) of an occupant from the light fixture 100. The one or more sensors 140 may be, for example, but not limited to, infrared (IR) sensors, ultrasonic sensors, audio sensor arrays, radar sensors, "time of flight" sensors, (e.g., laser, infrared, radio, acoustic, etc.), distance-based photoelectric sensors, radio frequency identification (RFID) tag readers, near field communication (NFC) tag readers, a Bluetooth® radio, an UWB radio, a Wi-Fi® radio from a mobile device carried by the occupant, or other ranging technology sensors capable of detecting the distance of an occupant from the light fixture, or combinations thereof. One of ordinary skill in the art will appreciate that other variations of the light fixture 100 may be implemented without departing from the scope of the present disclosure.

Table 1 provides an exemplary lighting profile of controlled intensity levels with respect to the distance of an occupant from a light fixture in accordance with various aspects of the present disclosure.

TABLE 1

| Fixture Intensity vs. Distance to Occupant | |
| --- | --- |
| Distance from light fixture | Intensity level |
| <30 feet | 20% intensity |
| <20 feet | 50% intensity |
| <15 feet | 75% intensity |
| <10 feet | 100% intensity |

In accordance with various aspects of the present disclosure, intensity levels may be "scaled" based on overall room/zone settings, ambient or outdoor light levels, etc. Transitions between intensity levels in the lighting profile may either be step functions or more aesthetic, smooth transitions.

One of ordinary skill in the art will appreciate that the indicated intensity levels and distances shown in Table 1 are merely exemplary and that different and/or additional intensity levels and distances may be used without departing from the scope of the present disclosure. Further, different and/or additional intensity levels and distances may be used with different types of light fixtures without departing from the scope of the present disclosure.

In accordance with various aspects of the present disclosure, intensity levels with respect to the distance of an occupant from a light fixture may be determined based on multiples of the light fixture height. For example, Table 2 provides an exemplary lighting profile of controlled intensity levels with respect to distance of an occupant from a light fixture expressed in multiples of a typical commercial ceiling height of 10 feet.

TABLE 2

| Fixture Intensity vs. Distance to Occupant | |
|---|---|
| Distance from light fixture | Intensity level |
| <3 × light fixture height | 20% intensity |
| <2 × light fixture height | 50% intensity |
| <1.5 × light fixture height | 75% intensity |
| <1 × light fixture height | 100% intensity |

In accordance with various aspects of the present disclosure, intensity levels may be "scaled" based on overall room/zone settings, ambient or outdoor light levels, etc. Transitions between intensity levels may either be step functions or smooth transitions.

One of ordinary skill in the art will appreciate that the indicated intensity levels and distances shown in Table 2 are merely exemplary and that different and/or additional intensity levels and distances may be used without departing from the scope of the present disclosure. Further, different and/or additional intensity levels and distances may be used with different types of light fixtures without departing from the scope of the present disclosure. In addition, other lighting characteristics may be controlled without departing from the scope of the present disclosure.

Light fixtures within a space may simultaneously react to the proximity of an occupant by independently setting their own light levels (i.e., intensity). As used herein, the term "occupant" may be used to designate an individual or object (e.g., a person, an animal, vehicle, robot, drone, photovoltaic cell, beacon/marker to be highlighted (e.g., a mannequin in a store display), machines, etc.) interacting with the various embodiments of the present disclosure. One of ordinary skill in the art will appreciate that this list is not exhaustive and that other objects may be considered "occupants" without departing from the scope of the present disclosure. Light fixtures that are near to an occupant may be lit brighter, while light fixtures that are outside a certain distance are dimmed or unlit. Intermediate light levels for the light fixtures may be established to create a smooth, dynamic pool of light surrounding occupants, with decreasing intensity further away from occupants. Transitions between intensity levels may either be step functions or more aesthetic, smooth transitions.

Accordingly, an occupant present within the proximity of a light fixture may experience full illumination in the immediate area with the illumination tapering off as the distance from the immediate area increases. In accordance with various aspects of the present disclosure, each light fixture functions independently enabling multiple occupants in different areas of a given space to be accommodated with appropriate lighting. In addition, embodiments according to the present disclosure may operate in parallel with other defined lighting profiles if other defined lighting profiles exist for light fixtures in a space.

In some instances, multiple occupants may be sensed within the proximity of a light fixture. In accordance with various aspects of the present disclosure, the nearest occupant may determine the state (e.g., the intensity level or other lighting characteristic) of the light fixture. In some cases, one or more occupants may be identified to the light fixture by, for example, but not limited to, facial recognition or other identification means. Identified occupants may have associated lighting profiles indicating individual lighting characteristic requirements or preferences and/or priorities. In cases where the lighting profiles include priorities, the processor in the light fixture may cause the light fixture to default its state to the lighting profile of the occupant having the highest priority.

For example, in a horticultural application, e.g., a green house, etc., the sensors may detect plants and a worker. In the horticultural application, the lighting characteristics may be default to the lighting having the spectral content necessary for plant growth; however, an employee or robot in the area may require full spectrum lighting for proper vision. A lighting profile for the employee or robot may have a higher priority than the lighting profile for the plants. Accordingly, when the employee or robot is sensed and identified, the processor in the light fixture may cause the light fixture may change its state to a "white" (i.e., full spectrum) light to enable the employee or robot to see properly.

While embodiments that provide control of intensity have been described, embodiments in accordance with the present disclosure are not limited to this implementation. In some embodiments, additional or alternative lighting parameters/characteristics, for example, but not limited to, color, color point (e.g., color temperature), intensity level, optical distribution, color quality, spectral content, flicker, sanitation, circadian impact, etc., may be controlled. One of ordinary skill in the art will appreciate that this is not an exhaustive list of lighting parameters/characteristics and that other lighting parameters/characteristics may be controlled without departing from the scope of the present disclosure.

Each of the lighting parameters may be controlled based on a lighting profile for the particular parameter, the type of light fixture (e.g., LED, fluorescent, etc.), the location of the light fixture, etc. In some implementations, the lighting profile may be determined based on factors other than or in addition to proximity to the light fixture. For example, a lighting profile for circadian impact control may consider time of day and available daylight in addition to other factors as well proximity of an occupant to the light fixture.

FIGS. 2A-2D are diagrams illustrating an example illumination control pattern for a plurality of light fixtures 200 in a space according to various embodiments. The illumination control pattern may be implemented independently by the plurality of light fixtures 200 without communication from a central controller controlling the plurality of light fixtures 200, i.e., via distributed control, to produce the illumination control pattern.

In accordance with various aspects of the present disclosure, the plurality of light fixtures 200 may form a distributed control system. Each light fixture of the plurality of light fixtures 200 may receive signals from one or more sensors, for example, but not limited to, infrared (IR) sensors, ultrasonic sensors, audio sensor arrays, radar sensors, "time of flight" sensors, distance-based photoelectric sensors, radio frequency identification (RFID) tag readers, near field communication (NFC) tag readers, UWB radios, Bluetooth® radios, Wi-Fi® radios, or other sensors capable of detecting the distance of an occupant from the light fixture, or combinations thereof. In some embodiments, the sensors may be included in the light fixtures. In other embodiments, the sensors may be remotely located from the light fixtures or may be a combination of sensors included in the light fixtures and remotely located sensors. Sensors other than those embedded or incorporated into a light fixture may be referred to herein as sensors "associated with" the light fixture.

In some embodiments, a small group of light fixtures (e.g., four light fixtures or another number of light fixtures) may receive signals from the one or more sensors. In some cases, the group of light fixtures receiving the same signals from the one or more sensors may provide illumination having the same characteristics. For example, each of the light fixtures may provide light having the same intensity, color, color temperature, etc. In other cases, the group of light fixtures receiving the same signals from the one or more sensors may provide illumination having the different characteristics. For example, the sensor signals may indicate that an occupant is in close proximity to one light fixture of the group. The one light fixture may provide light having full intensity while the remaining light fixtures in the group that are further from the occupant may provide light having lesser intensity.

In some embodiments, a Bluetooth® or Wi-Fi® radio incorporated into one or more of the plurality of light fixtures may sense a signal, for example, but not limited to, a Bluetooth® Low Energy (BLE) or Wi-Fi® signal, from a mobile device carried by an occupant. For example, may sense a BLE or Wi-Fi® signal from a mobile device (i.e., passive sensing), or an application running on the mobile device may actively communicate with the Bluetooth® or Wi-Fi® radio incorporated into a light fixture. By passively sensing the mobile device or actively communicating with the mobile device, the light fixture may determine that an occupant is within a proximity of the light fixture and provide illumination in accordance with a lighting profile.

In some embodiments, proximity of an occupant to the light fixture may be detected by a Bluetooth® or Wi-Fi® radio incorporated into the light fixture based on an occupant without a mobile device affecting received signal strength indications (RSSI) of the radio. In some embodiments, active or passive tags (e.g., RFID tags, security badges, etc.) may be detected using RFID, BLE, UWB RF, or other suitable technology.

The proximity of the occupant to the light fixtures may be determined based on the sensor signals or radio signals received by the light fixtures. For example, a processor (e.g., the processor 110) in the light fixture may determine the proximity of the occupant to the light fixture based on signals received from the one or more sensors.

Figure 2A:
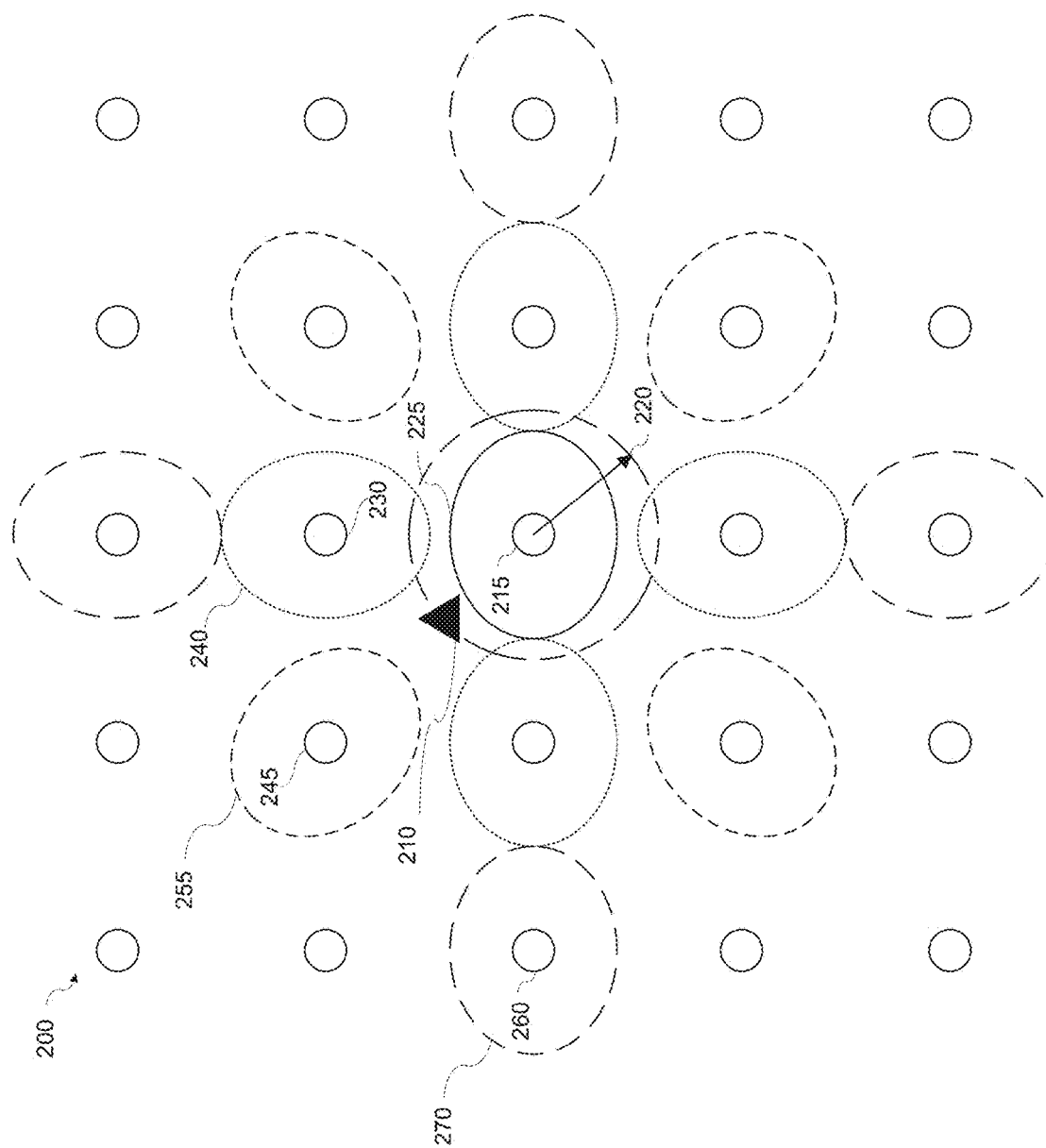
FIGS. 2A-2D are diagrams illustrating an example illumination control pattern for a plurality of light fixtures according to various aspects of the present disclosure.

Referring to FIG. 2A, the plurality of light fixtures 200 in the space may be arranged in a pattern, for example, but not limited to, a grid or other pattern. One or more sensors (e.g., the sensors 140) disposed in or associated with a first light fixture 215 positioned at an arbitrary location within the plurality of light fixtures may sense the proximity of an occupant 210, for example, within a first radius 220, for example, a 10 foot radius or another radius, of the first light fixture 215. The proximity of the occupant 210 with respect to the first light fixture 215 may be sensed by, for example, but not limited to, an IR sensor, an occupancy sensor, or other sensor incorporated into or associated with the first light fixture 215 and capable of sensing the distance of the occupant 210 from the first light fixture 215.

While proximity in the present example is described with respect to a radius, embodiments in accordance with the present disclosure are not limited to this implementation. In some implementations, proximity of an occupant to a light fixture may be determined with respect to distance and/or direction. In some implementations, the physical layout of the space as well as distance may be considered in determining proximity of an occupant to a light fixture. For example, light fixtures in an unoccupied restricted space or an unoccupied space behind a glass partition may remain unlit even when occupants in an adjacent space are detected by the light fixtures in the unoccupied space. One of ordinary skill in the art will appreciate that other methods of determining the proximity of an occupant to a light fixture may be used without departing from the scope of the present disclosure.

Based on the signals received from the one or more sensors, the processor (e.g., the processor 110) in the first light fixture 215 may determine a range of the occupant 210 with respect to the first light fixture 215. In response to the occupant 210 being sensed within a proximity of the first light fixture 215, i.e., within the first radius 220, the processor in the first light fixture 215 may control the first light fixture 215 to adjust its illumination to a first intensity 225 for example, 100% intensity or another intensity.

Figure 2B:
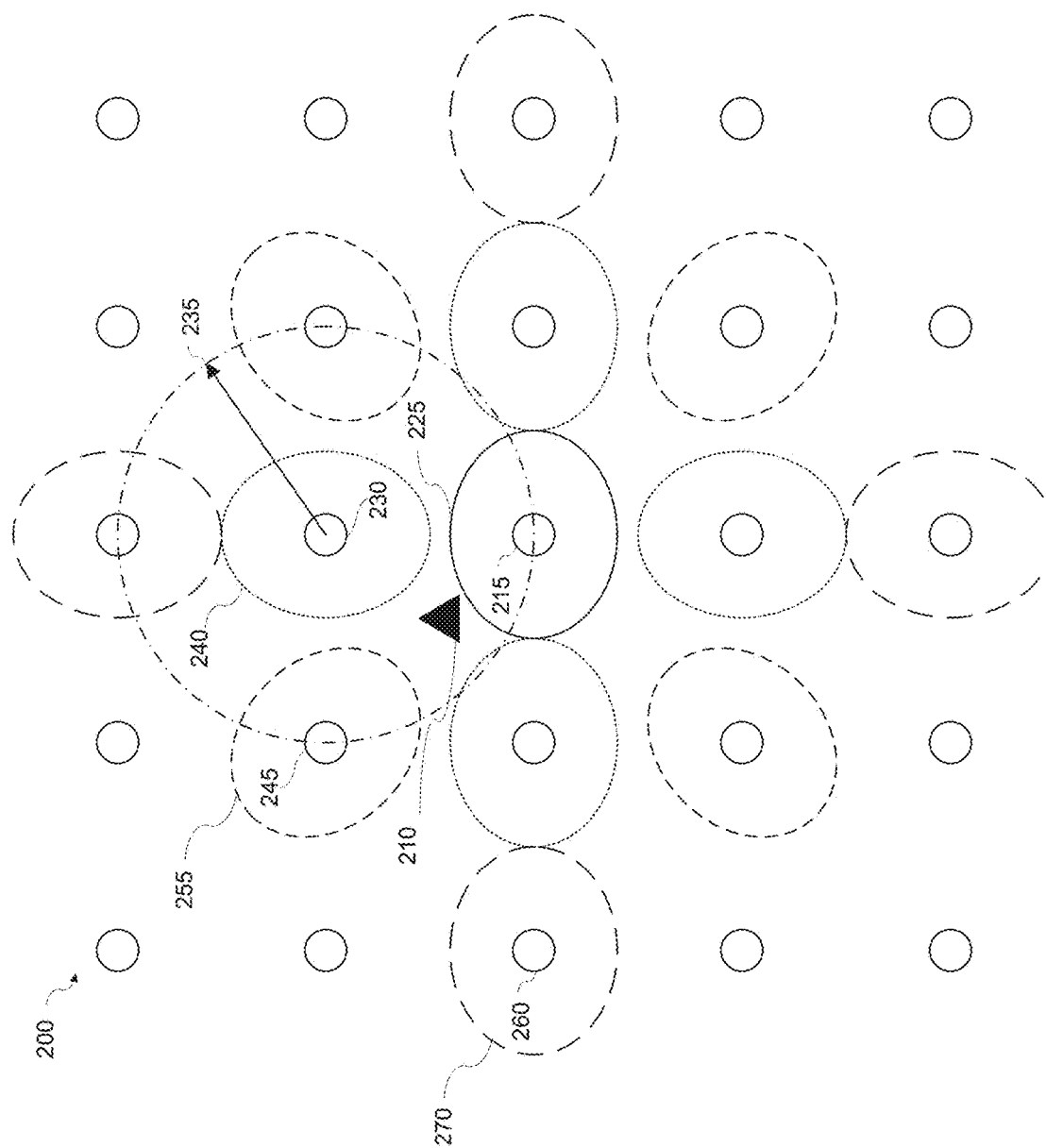

Referring to FIG. 2B, at approximately the same time as the proximity of the occupant 210 to the first light fixture 215 is sensed, one or more sensors disposed in or associated with a one or more neighboring second light fixtures 230 may sense the proximity of the occupant 210 within a second radius 235, for example a 15 foot radius or another radius, of the one or more second light fixtures 230. The proximity of the occupant 210 from the one or more second light fixtures 230 may be sensed by, for example, but not limited to, an IR sensor, an occupancy sensor, or other sensor incorporated into or associated with the second light fixture 230 and capable of sensing the distance of the occupant 210 from the one or more second light fixtures 230.

Based on the signals received from the one or more sensors, the processor in the second light fixture 230 may determine a range of the occupant 210 with respect to the second light fixture 230. For example, the processor may determine that the range of the occupant from the second light fixture 230 is within the second radius but greater than a minimum range that calls for a higher intensity. In response to the occupant 210 being sensed within a proximity of the one or more second light fixture 230, i.e., within the second radius 235, the processors in the one or more second light fixtures 230 may control the one or more second light fixtures 230 to adjust illumination to a second intensity 240, for example, 75% intensity or another intensity.

Figure 2C:
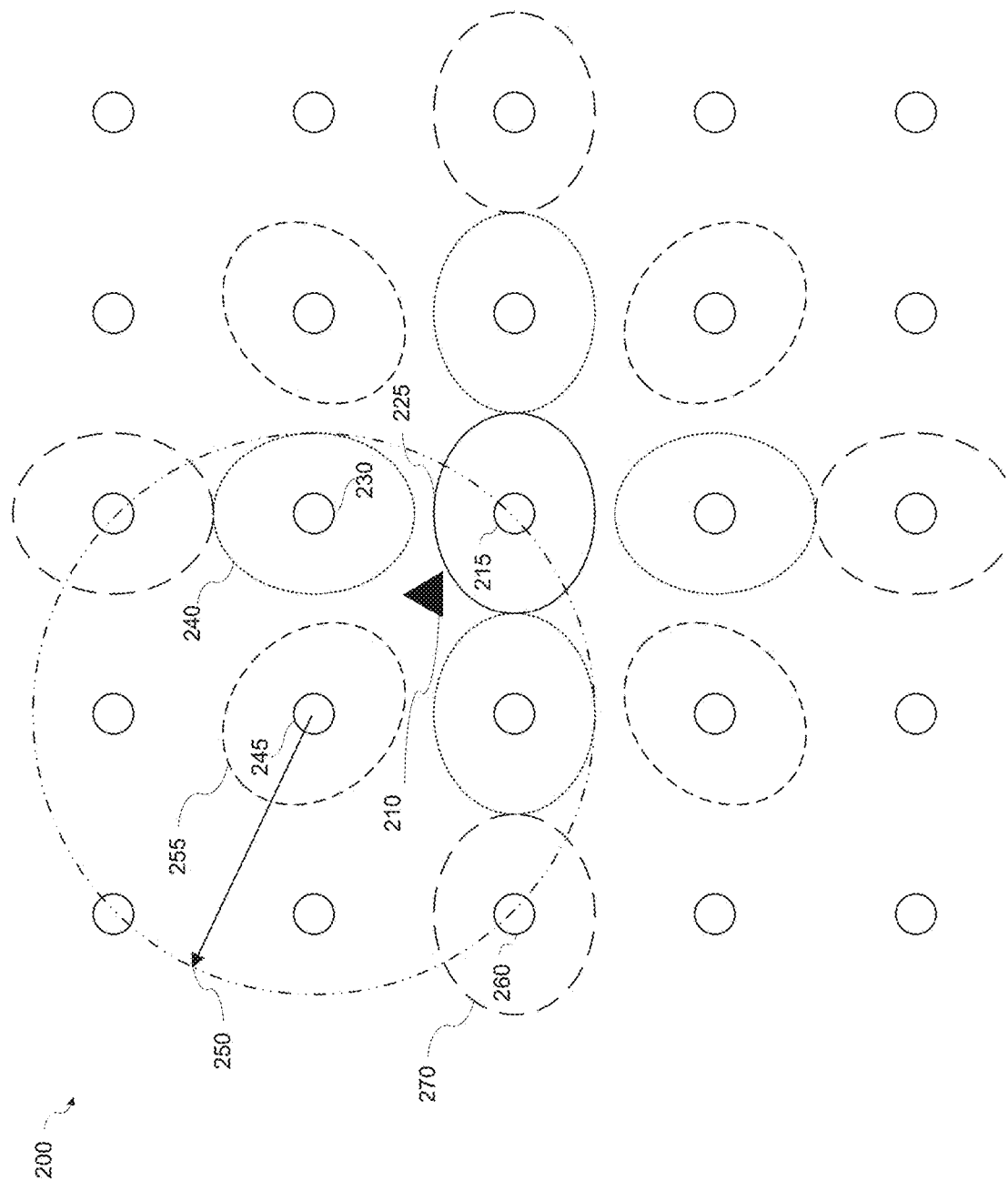
Figure 2D:
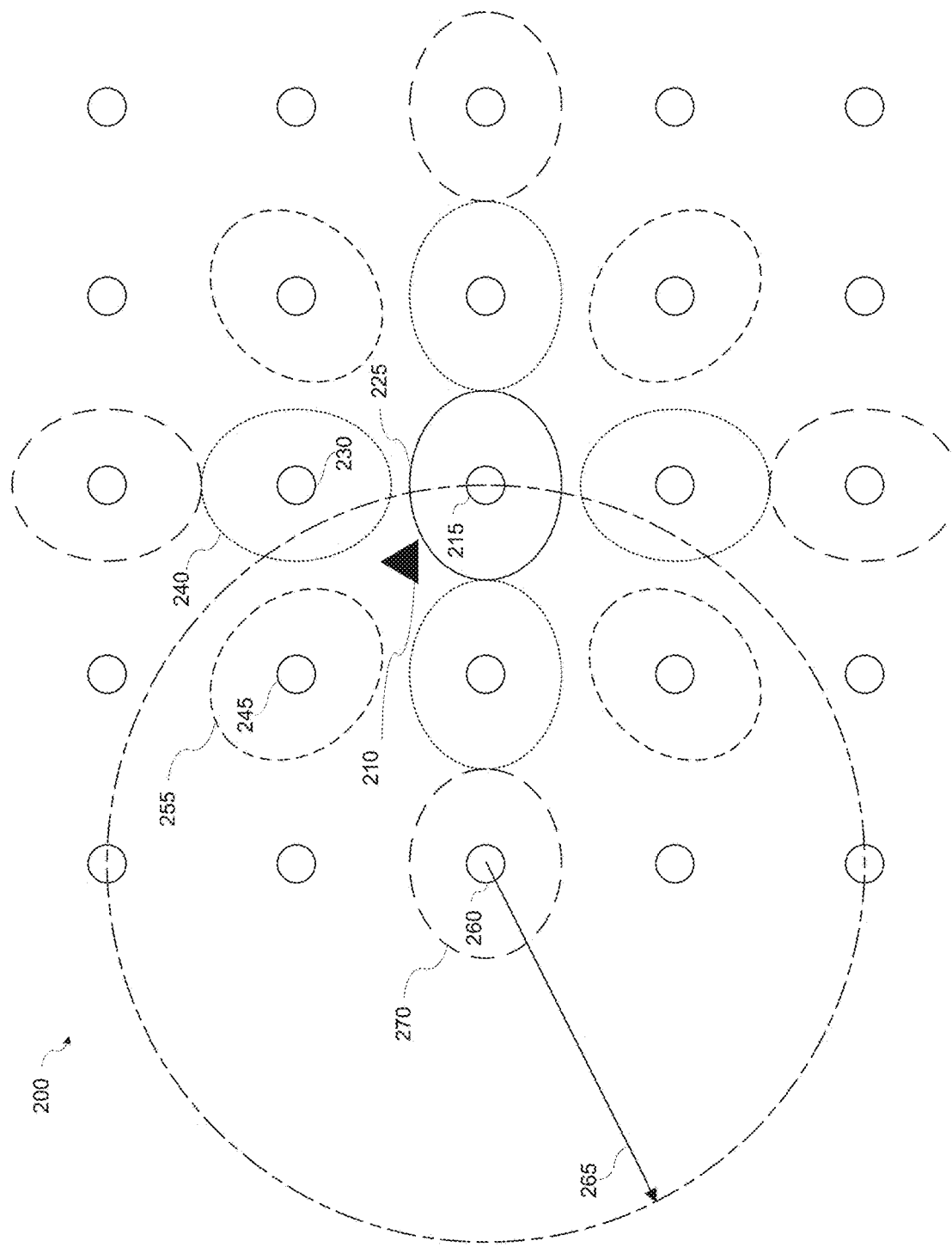

Similarly, referring to FIGS. 2C and 2D, one or more sensors disposed in or associated with a one or more neighboring third light fixtures 245 may sense the proximity of the occupant within a third radius 250, for example a 20 foot radius or another radius, of the one or more third light fixtures 245, and one or more sensors disposed in or associated with a one or more neighboring fourth light fixtures 260 may sense the proximity of the occupant within a fourth radius 265, for example a 30 foot radius or another radius, of the one or more fourth light fixtures 260. The proximity of the occupant 210 from the one or more third light fixtures 245 and the one or more fourth light fixtures 260 may be sensed by, for example, but not limited to, an IR sensor, an occupancy sensor, or other sensor incorporated into or associated with the second light fixture 230 and capable of sensing the distance of the occupant 210 from the one or more third light fixtures 245 and the one or more fourth light fixtures 260, respectively.

Based on the signals received from the one or more sensors, the processors in the third and fourth light fixtures 245, 260, respectively, may determine a range of the occupant 210 with respect to the third and fourth light fixtures 245, 260. For example, the processors in the third and fourth light fixtures 245, 260 may determine that the range of the occupant from the third and fourth light fixtures 245, 260 is within the third and fourth radii, respectively, but greater than minimum ranges that call for a higher intensity.

In response to the occupant 210 being sensed within a proximity of the one or more third light fixtures 245 and the one or more fourth light fixtures 260, i.e., within the third and fourth radii, the processors in the one or more third light fixtures 245 may control the one or more third light fixtures 245 to adjust illumination to a third intensity 255, for example, 50% intensity or another intensity, and the processors in the one or more fourth light fixtures 260 may control the one or more fourth light fixtures 260 to adjust illumination to a fourth intensity 270, for example, 25% intensity or another intensity.

Although the above example may be described as using one or more sensors integrated with the light fixtures, embodiments in accordance with the present disclosure are not limited to this implementation. According to various aspects of the present disclosure, the one or more sensors may be located remotely from the light fixtures, or may be a combination of sensors integrated with the light fixtures and located remotely from the light fixtures.

Further, while the examples of FIGS. 2A-2D have been described based on embodiments that provide control of lighting intensity, embodiments in accordance with the present disclosure are not limited to this implementation. In some embodiments, additional or alternative lighting parameters/characteristics, for example, but not limited to, color, color point (e.g., color temperature), intensity level, optical distribution, color quality, spectral content, flicker, sanitation, circadian impact, etc., may be controlled. One of ordinary skill in the art will appreciate that this is not an exhaustive list of lighting parameters/characteristics and that other lighting parameters/characteristics may be controlled without departing from the scope of the present disclosure.

In some embodiments, the light fixture may additionally or alternatively include a Bluetooth® or Wi-Fi® transceiver primarily used for data communication, for example, but not limited to, commissioning. However, variations in received signal strength indication (RSSI) by the Bluetooth® or Wi-Fi® transceiver may be used to sense some conditions, for example, but not limited to, proximity of an occupant, in the space around the light fixture.

While FIGS. 2A-2D illustrate an example of an occupant positioned within various proximities of different light fixtures using only one light fixture at each radius, one of ordinary skill in the art will appreciate that an occupant may be within a same radius of more than one light fixture at the same time and that each light fixture may illuminate at intensity commensurate with the closest sensed proximity of the occupant.

One of ordinary skill in the art will appreciate that while certain detection radii and intensity levels have been described, these detection radii and intensity levels are exemplary and other detection radii and/or intensity levels may be used without departing from the scope of the present disclosure. Additionally, more or less detection radii and intensity levels may be used without departing from the scope of the present disclosure. Further, while the exemplary radii are illustrated as being circular, the embodiments are not limited to this implementation. In some embodiments, detection and/or ranging may vary based on direction. For example, detection and/or ranging may be different along the length of a hallway than across the width of a hallway.

In accordance with various aspects of the present disclosure, embodiments may provide leading and/or following lighting for an occupant moving throughout a space, for example, but not limited to, a hallway. As the occupant moves through a space, the light fixtures may adjust their intensity according to the sensed proximity of the occupant to each light fixture. For example, when the occupant is sensed within a first radius of a light fixture, the light fixture may illuminate at 100% intensity. As the occupant proceeds through the space, the light fixture may sense that the occupant is further away, for example outside of the first radius but still within a second radius, and may reduce its illumination, for example to 75% or another illumination less than 100%.

As the occupant continues to move outside of the second radius to within a third radius, the light fixture may reduce its illumination still further. In a like manner, the light fixture may reduce its illumination as the occupant is sensed at further distances until the illumination reaches a minimum level that may be set in accordance with the requirements of the lighting system.

Similarly, as an occupant approaches a light fixture, the light fixture may provide illumination based on the sensed proximity of the occupant to the light fixture. In accordance with various aspects of the present disclosure, the light fixtures may communicate, for example, via IR, Bluetooth®, or another wireless or wired technology and/or protocol, to notify neighboring light fixtures of an occupant within proximity of one of the light fixtures, thereby enabling neighboring light fixtures to adjust illumination according to their relative proximities to the light fixture providing the notification.

In accordance with various aspects of the present disclosure, more advanced sensor technologies, for example, but not limited to, laser-based "time of flight" sensors, RF based systems, or 2D/3D imaging sensors may enable precise occupant tracking, and/or tracking of multiple occupants within a space. In some embodiments, sensors, for example, but not limited to, Bluetooth®/Wi-Fi®/UWB radios as sensors, radar, microphonic sensors, cameras, facial recognition sensing, etc., that can uniquely identify an occupant may be used to match a lighting profile to that specific occupant, and implement functions to, for example, provide a zone of privacy around the occupant (i.e., suppress video monitoring), or provide other sophisticated functions.

In accordance with various aspects of the present disclosure, inconsistent profiles of occupants in the same space may be reconciled. When two or more occupants with different associated profiles are detected, a light fixture may default to any suitable conflict resolution scheme. For example, the processor of the light fixture may be programmed to recognize a hierarchy of profiles such that the highest associated profile in the hierarchy would be prioritized. In other examples, the processor of the light fixture may cause the light fixture to default to a "greatest common denominator," e.g., when intensity is being controlled, the associated profile requiring the highest intensity may control. As a third example, the processor of the light fixture may cause the state of the fixture to change in accordance with the lighting profile associated with the occupant closest to the light fixture when the occupants are at different ranges from the light fixture. One of ordinary skill in the art will appreciate that other conflict resolution schemes may be employed without departing from the scope of the present disclosure.

Figure 3:
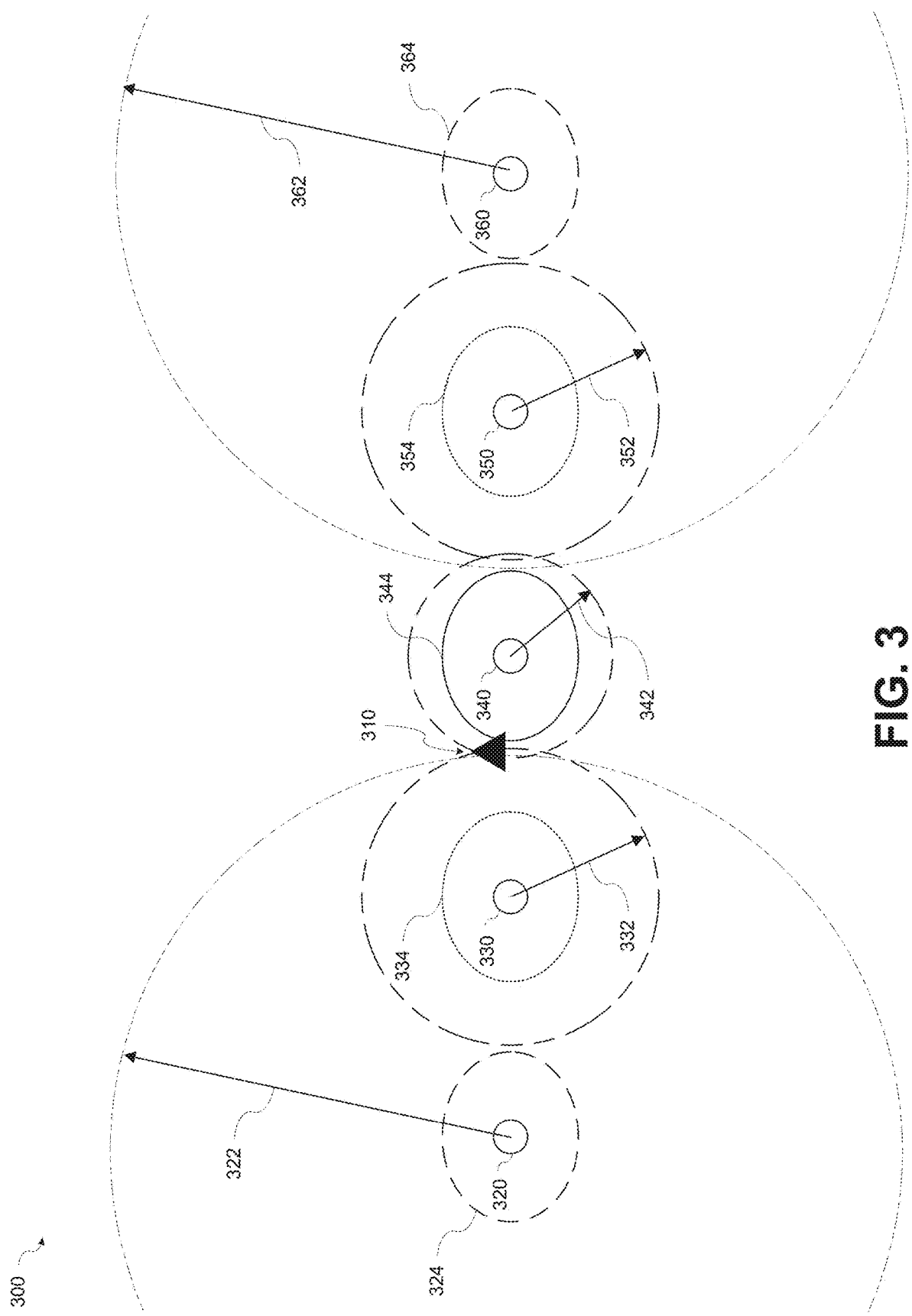
FIG. 3 is a diagram illustrating a plurality of light fixtures providing leading/following lighting in according to various aspects of the present disclosure.

FIG. 3 is an illustration of a plurality of light fixtures providing leading/following lighting 300 in accordance with various aspects of the present disclosure. The illustrated light fixtures may be in an indoor space, for example, in a hallway. Each of the plurality of light fixtures may sense an occupant at various distances from the light fixture and simultaneously provide illumination accordingly, for example, based on an intensity profile (e.g., the intensity profile shown in Table 1 or another intensity profile) for the light fixture. Referring to FIG. 3, as an occupant 310 proceeds down the hallway and approaches the third light fixture 340, one or more sensors disposed in or associated with the third light fixture 340 may sense that the occupant 310 is within a proximity of the third light fixture 340, for example, within a first radius 342 of approximately 10 feet or another radius. The proximity of the occupant 310 from the third light fixture 340 may be sensed by, for example, but not limited to, an IR sensor, an occupancy sensor, or other sensor incorporated into or associated with the third light fixture 340 and capable of sensing the distance of the occupant 310 from the third light fixture 340. Based on the signals received from the one or more sensors, the processor (e.g., the processor 110) in the third light fixture 340 may determine a range of the occupant 310 with respect to the third light fixture 340.

When the occupant 310 is sensed within the first radius 342 of the third light fixture 340, the processor in the third light fixture 340 may cause the third light fixture 340 to adjust its illumination to a first intensity 344, for example, at 100% intensity or another intensity. At approximately the same time as the occupant is sensed by the one or more sensors disposed in or associated with the third light fixture 340, one or more sensors disposed in or associated with a second light fixture 330 may sense that the occupant 310 is a further distance away, for example, within a second radius 332 of approximately 15 feet or another radius, of the second light fixture 330, having moved past the second light fixture 330.

The proximity of the occupant 310 from the second light fixture 330 may be sensed by, for example, but not limited to, an IR sensor, an occupancy sensor, or other sensor incorporated into or associated with the second light fixture 330 and capable of sensing the distance of the occupant 310 from the second light fixture 330. Based on the signals received from the one or more sensors, the processor in the second light fixture 330 may determine a range of the occupant 310 with respect to the second light fixture 330. For example, the processor may determine that the range of the occupant from the second light fixture 330 is within the second radius but greater than a minimum range that calls for a higher intensity. In response to sensing that the occupant 310 is further away, the processor in the second light fixture 330 may control the second light fixture 330 to reduce its illumination to a second illumination 334, for example, 75% intensity or another intensity less than 100%.

Likewise, at approximately the same time as the occupant is sensed by the one or more sensors disposed in or associated with the third light fixture 340, one or more sensors disposed in or associated with the first light fixture 320 may sense that the occupant 310 is even a further distance away, for example, within a third radius 322 of approximately 20 feet or another radius, having moved a further distance past the first light fixture 320. The proximity of the occupant 310 from the first light fixture 320 may be sensed by, for example, but not limited to, an IR sensor, an occupancy sensor, or other sensor incorporated into or associated with the first light fixture 320 and capable of sensing the distance of the occupant 310 from the first light fixture 320. Based on the signals received from the one or more sensors, the processor in the third light fixture 340 may determine a range of the occupant 310 with respect to the third light fixture 340.

In response to sensing that the occupant 310 is further away, the processor in the first light fixture 320 may control the first light fixture 320 to reduce its illumination more than the illumination of the second light fixture 330 to a third intensity 324, for example, to 50% intensity or another intensity less than 100%. As the occupant continues to move further away from a light fixture, the one or more sensors disposed in or associated with the light fixture may sense the proximity of the occupant, and based on the signals received from the one or more sensors, the processor may continue to decrease the intensity of the light fixtures. When the one or more sensors disposed in or associated with a light fixture no longer sense the proximity of an occupant, or when the one or more sensors disposed in or associated with the light fixture sense the occupant at a specified distance from the light fixture, the processor in the light fixture may control the light fixture to extinguish the illumination or reduce the illumination to a specified minimum intensity.

Similarly, as the occupant 310 proceeds along the hallway, one or more sensors disposed in or associated with the fourth light fixture 350 may sense the occupant at a distance away from the fourth light fixture 350, for example, within a fourth radius 352 of approximately 15 feet or another radius, the occupant 310 having moved closer to the fourth lighting fixture 350. The proximity of the occupant 310 from the fourth light fixture 350 may be sensed by, for example, but not limited to, an IR sensor, an occupancy sensor, or other sensor incorporated into or associated with the fourth light fixture 350 and capable of sensing the distance of the occupant 310 from the fourth light fixture 350. Based on the signals received from the one or more sensors, the processor in the fourth light fixture 350 may determine a range of the occupant 310 with respect to the fourth light fixture 350.

In response to the occupant 310 being sensed by the one or more sensors disposed in or associated with the fourth light fixture 350 within the fourth radius 352, the processor in the fourth light fixture 350 may cause the fourth light fixture 350 to adjust its illumination to a fourth intensity 354, for example, 75% intensity or another intensity less than 100%. Likewise, one or more sensors disposed in or associated with the fifth light fixture 360 may sense that the occupant 310 is a distance away, for example, within a fifth radius 362 of approximately 20 feet or another radius.

Based on the signals received from the one or more sensors, the processor in the fifth light fixture 360 may determine a range of the occupant 310 with respect to the fifth light fixture 360. In response to sensing that the occupant 310 is a distance away, the processor in the fifth light fixture 360 may control the fifth light fixture 360 to illuminate at a fifth intensity 364 less than the intensity of the fourth light fixture 350, for example, to 50% intensity or another intensity less than 100%. As the occupant continues to move closer to a light fixture, the one or more sensors disposed in or associated with the light fixture may sense the proximity of the occupant and the processor in the light fixture may control the light fixture to continue to increase its intensity.

Further, while the example of FIG. 3 has been described based on embodiments that provide control of lighting intensity, embodiments in accordance with the present disclosure are not limited to this implementation. In some embodiments, additional or alternative lighting parameters/characteristics, for example, but not limited to, color, color point (e.g., color temperature), intensity level, optical distribution, color quality, spectral content, flicker, sanitation, circadian impact, etc., may be controlled. One of ordinary skill in the art will appreciate that this is not an exhaustive list of lighting parameters/characteristics and that other lighting parameters/characteristics may be controlled without departing from the scope of the present disclosure.

In some embodiments, the light fixtures may be networked and may communicate with each other and/or a central controller. The networked light fixtures may triangulate the location of the occupant in the space from the distance measurements determined by the light fixtures. The location of the occupant may be communicated to other networked light fixtures that do not have sensors to enable the other networked light fixtures to respond per the appropriate distance-intensity profile. Additionally, the occupant location may be used to provide other, non-lighting services, for example, wayfinding, control of building services, etc.

Thus, in accordance with various aspects of the present disclosure, as an occupant moves through a space, a light fixture closest to the occupant may illuminate at full intensity while neighboring light fixtures may decrease illumination based on the sensed distance of the occupant from the light fixtures. For example, to encourage an occupant to continue in a direction, light fixtures ahead of the occupant may illuminate with varying intensities with the light fixture or fixtures closest to the occupant illuminating with the highest intensity and the intensities of light fixtures ahead of the occupant gradually decreasing with distance for light fixtures further ahead of the occupant. Similarly, the intensities of light fixtures may gradually decrease with distance for light fixtures further behind the occupant.

One of ordinary skill in the art will appreciate that while certain detection radii and intensity levels have been described, these detection radii and intensity levels are exemplary and other detection radii and/or intensity levels may be used without departing from the scope of the present disclosure. Additionally, more or fewer detection radii and intensity levels may be used without departing from the scope of the present disclosure.

Figure 4:
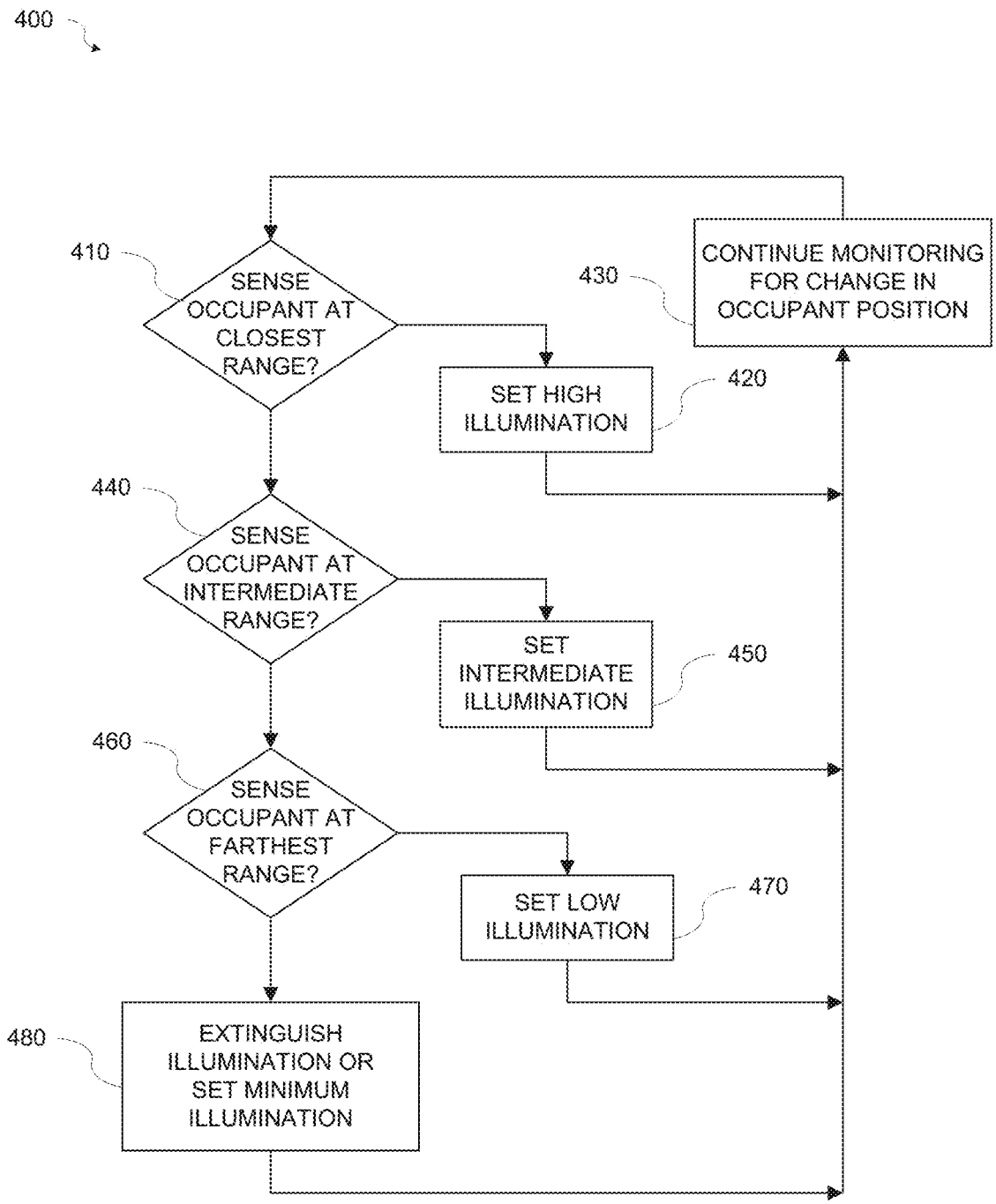
FIG. 4 is a flowchart of a method for providing leading/following illumination in accordance with various aspects of the present disclosure according to various aspects of the present disclosure.

FIG. 4 is a flowchart of a method 400 for providing leading/following illumination in accordance with various aspects of the present disclosure. Referring to FIG. 4, at block 410, an occupant may be sensed at a close distance to a light fixture. For example, one or more sensors disposed in or associated with a light fixture (e.g., the first light fixture 320) may sense that the occupant is within a proximity of the light fixture, for example, within a first radius around the light fixture (e.g., a radius of about 10 feet or another radius). The one or more sensors may be, for example, but not limited to, infrared (IR) sensors, ultrasonic sensors, audio sensor arrays, radar sensors, "time of flight" sensors, distance-based photoelectric sensors, radio frequency identification (RFID) tag readers, near field communication (NFC) tag readers, UWB radios, Bluetooth® radios, Wi-Fi® radios, or other sensors capable of detecting the distance of an occupant from the light fixture, or combinations thereof. Based on the signals received from the one or more sensors, the processor in the light fixture may determine a range of the occupant with respect to the light fixture.

In response to sensing the occupant within the first radius (410-Y), at block 420, the processor in the light fixture may cause the light fixture to adjust its illumination to a high intensity or may cause another lighting or non-lighting parameter/characteristic to be adjusted. For example, the processor in the light fixture may cause the light fixture to adjust its illumination to 100% intensity or another intensity. At block 430, the method may continue to monitor for a change in the position of the occupant. For example, one or more sensors disposed in or associated with the light fixture and one or more sensors disposed in or associated with neighboring light fixture may sense the proximity of the occupant.

In response to the one or more sensors disposed in or associated with the light fixture not sensing that the occupant is within the first radius of the light fixture (410-N), at block 440, the one or more sensors disposed in or associated with the light fixture may sense that the occupant is within an intermediate distance of the light fixture, for example, within a second radius around the light fixture (e.g., a radius of about 15 feet or another radius). Based on the signals received from the one or more sensors, the processor in the light fixture may determine a range of the occupant with respect to the light fixture. For example, the processor may determine that the range of the occupant from the light fixture is within the second radius but greater than a minimum range that calls for a higher intensity.

In response to sensing the occupant within the second radius (440-Y), at block 450, the processor in the light fixture may cause the light fixture to adjust its illumination to an intermediate intensity or may cause another lighting or non-lighting parameter/characteristic to be adjusted. For example, the processor in the light fixture may cause the light fixture to adjust its illumination to 75% intensity or another intensity. The method may continue at block 430 to monitor for a change in the position of the occupant.

In response to the one or more sensors disposed in or associated with the light fixture not sensing that the occupant is within the second radius of the light fixture (440-N), at block 460, the one or more sensors disposed in or associated with the light fixture may sense that the occupant is within a more distant proximity of the light fixture, for example, within a third radius around the light fixture (e.g., a radius of about 20 feet or another radius). Based on the signals received from the one or more sensors, the processor in the light fixture may determine a range of the occupant with respect to the light fixture. For example, the processor may determine that the range of the occupant from the light fixture is within the third radius but greater than a minimum range that calls for a higher intensity. In response to sensing the occupant within the third radius (460-Y), at block 470, the light fixture may adjust its illumination to a low intensity or may cause another lighting or non-lighting parameter/characteristic to be adjusted. For example, the processor in the light fixture may cause the light fixture to adjust its illumination to 50% intensity or another intensity. The method may continue at block 430 to monitor for a change in the position of the occupant.

In response to the one or more sensors disposed in or associated with the light fixture not sensing that the occupant is within the third radius of the light fixture (460-N), at block 480, the processor may control the light fixture to extinguish its illumination or adjust its illumination to a set minimum intensity or may cause another lighting or non-lighting parameter/characteristic to be adjusted. The method may continue at block 430 to monitor for a change in the position of the occupant. Thus, as the position of the occupant changes with respect to a light fixture, the position of the occupant may be sensed and the illumination provided by the light fixture adjusted or another lighting or non-lighting parameter/characteristic may be adjusted accordingly.

One of ordinary skill in the art will appreciate that while the example methods describes only three proximities for detecting the an occupant, more or less proximities for detecting an occupant may be provided without departing from the scope of the present disclosure.

The method 400 may be embodied on a non-transitory computer readable medium, for example, but not limited to, the memory 160 or other non-transitory computer readable medium known to those of skill in the art, having stored therein a program including computer executable instructions for making a processor, computer, or other programmable device execute the operations of the method.

Although the above examples may be described as using one or more sensors integrated with the light fixtures, embodiments in accordance with the present disclosure are not limited to this implementation. According to various aspects of the present disclosure, the one or more sensors may be located remotely from the light fixtures, or may be a combination of sensors integrated with the light fixtures and located remotely from the light fixtures.

In accordance with various aspects of the present disclosure, one or more sensors disposed in or associated with each light fixture may individually sense the proximity of the occupant to the light fixture and may enable the processors in each light fixture to control each light fixture to provide illumination based on the sensed proximity. However, embodiments according to the present disclosure are not limited to this implementation. For example, in some embodiments, a light fixture may communicate, for example, via IR, Bluetooth®, Wi-Fi®, or another wireless or wired technology and/or protocol, with one or more neighboring light fixtures to notify the neighboring light fixtures of an occupant within a certain proximity of the light fixture.

Collating range data between communicating light fixtures may allow the system to triangulate the location of the occupant and provide location services to the occupant (e.g., wayfinding, coupon delivery, asset tracking, etc.) or to the manager of the space (e.g., mapping routes, dwell times, etc.) to identify customer activities. In addition, the light fixtures in communication with each other may use the location data to integrate light fixtures that do not have sensors into the control scheme.

In accordance with various aspects of the present disclosure, the light fixtures in communication with each other may use the location data for predictive responses. For example, when light fixture A detects an occupant in close proximity and light fixture B detects the same occupant at a further proximity, then the processor in light fixture C may "wake" the sensor(s) in light fixture C to enable quicker response to the occupant. Alternatively or additionally, the processor in light fixture C may might preemptively initiate a lighting condition if executing the lighting condition involves some noticeable time delay.

In some embodiments, the light fixtures in communication with each other may enable integrated control of other building services (e.g., HVAC, etc.). For example, an air handler for a specific area may use the occupancy data from nearby light fixtures to adjust the air flow in the area.

Based on the communication, processors in the neighboring light fixtures may adjust lighting characteristics or enable other non-lighting services according to the relative proximities of the light fixtures to the light fixture providing the notification.

While examples have been described with respect to indoor spaces, the various embodiments are not limited to indoor spaces. In some implementations, embodiments may provide leading/following lighting in outdoor spaces, for example, but not limited to, parking lots, walkways, roadways, etc. In some implementations, for example, but not limited to, roadway lighting, the light fixtures may provide the brightest illumination at a light fixture furthest away from a vehicle sensed by the light fixtures, with illumination decreasing for light fixtures closer to the vehicle. By providing the brightest illumination farthest from the vehicle, visibility is increased while glare is reduced by providing lower illumination closer to the vehicle.

Some embodiments of the present disclosure may provide aesthetically pleasing lighting in addition or alternatively to operational lighting. For example, processors in each light fixture may control each light fixture to provide aesthetically pleasing illumination, for example, but not limited to, colored illumination or other aesthetically pleasing illumination, on a wall when an occupant is not in immediate proximity to the wall. The aesthetically pleasing illumination may change to operational lighting having illumination of higher intensity and/or a color providing greater visibility of the area when an occupant is in closer proximity to the wall, i.e., walking or standing next to the wall. As another example, processors in each light fixture along a walkway may control each light fixture to provide dimmed and/or colored lighting to a portion of a walkway at a distance from an occupant walking on the walkway. The processors in each light fixture may control the light fixtures to change the dimmed and/or colored lighting to higher intensity operational lighting providing greater visibility as the occupant approaches the various lighting fixtures.

While various embodiments of the present disclosure function using distributed control, embodiments of the present disclosure are not limited to this implementation. In some embodiments, a central controller may be used. For example, a plurality of light fixtures may wirelessly communicate data collected by sensors to a central controller. A processor in the central controller may evaluate the received data to create lighting profiles, for example, lighting schemes and/or timings for specific spaces or specific occupants. The central controller may wirelessly communicate the lighting profiles to the plurality of light fixtures.

Some embodiments may be linked to other more complex/higher-resolution systems, for example, but not limited to, security monitoring systems, video surveillance systems, etc. In accordance with various aspects of the present disclosure, information from the distributed sensors provided by the embodiments of the present disclosure could be used to trigger or prioritize specific security cameras of a security system or other zone monitoring devices. For example, in some embodiments, video sensors disposed in or associated with one or more light fixtures may enable facial recognition and identification of an unauthorized person. Identification of the unauthorized person may activate specific security cameras and/or provide an alarm or warning. One of ordinary skill in the art will appreciate that the indicated functions are merely exemplary and that other functions may be provided without departing from the scope of the present disclosure.

In accordance with aspects of the present disclosure, various embodiments may serve as a front end for a "learning" system. Individual user behaviors may be observed over time. The observed behaviors may be used to develop a customized lighting profile for each user. As an example, an occupant's normal movements in a large area may be aggregated into a profile which includes their primary collaborators and team members, the printer they typically use, pathways to the nearest exits and restrooms, etc. The user profile may then be used to generate a lighting profile to specifically accommodate the user's routine. The distributed control system of the present disclosure may implement the lighting profile when the user is recognized.

In accordance with various aspects of the present disclosure, the distributed control system provided by disclosed embodiments may be deployed in conjunction with other types of light fixtures that are not included in the distributed control system. For example, daylight harvesting light fixtures may control illumination based on ambient light regardless of the proximity of an occupant. In some installations, the daylight harvesting light fixtures may be disposed along a wall of windows while light fixtures in accordance with the distributed control system of the present disclosure may provide illumination elsewhere in the space based on occupant proximity.

One of ordinary skill in the art will appreciate that other implementations of other types of light fixtures deployed in conjunction with embodiments of the present disclosure are possible without departing from the scope of protection.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A distributed lighting control system, including:
a plurality of independently controlled light fixtures, each light fixture of the plurality of independently controlled light fixtures comprising:
an illuminating element;
driver circuitry operatively coupled to the illuminating element and configured to provide power to the illuminating element;
a proximity sensor; and
a processor operatively coupled to the proximity sensor and the driver circuitry, the processor configured to:
receive signals from the proximity sensor; and
control the driver circuitry to provide power to the illuminating element to generate illumination based on the received signals from only the proximity sensor,
wherein illumination provided by each light fixture of the plurality of independently controlled light fixtures is controlled independently of the illumination provided by others of the plurality of independently controlled light fixtures,
wherein a plurality of different levels of illumination are simultaneously provided by a plurality of subsets of light fixtures in the plurality of independently controlled light fixtures without control by a central controller based only on a sensed proximity of an occupant individually sensed by each light fixture in each of the plurality of subsets of light fixtures, and
wherein the plurality of different levels of illumination provide changing illumination as the occupant is sensed at further proximities with respect to each of the subsets of light fixtures by the proximity sensor of each of the plurality of independently controlled light fixtures in each of the subsets of light fixtures.

2. The system of claim 1, wherein the proximity sensor of each light fixture is configured to sense a proximity of the occupant to the light fixture, and
the processor of the light fixture is configured to determine a range of the occupant with respect to the light fixture based on received signals from the proximity sensor.

3. The system of claim 2, wherein the processor of the light fixture is configured to control the driver circuitry to provide power to the illuminating element to generate illumination based on the determined range of the occupant with respect to the light fixture.

4. The system of claim 1, wherein:
the processor of the light fixture is configured to control the driver circuitry to provide power to the illuminating element to generate illumination based on a proximity of the occupant to the light fixture; and
the processor of the light fixture is configured to control the driver circuitry to provide power to the illuminating element to generate a first illumination having a first intensity when the occupant is determined to be at a first proximity with respect to the light fixture, and to generate a second illumination having a second intensity less bright than the first intensity when the occupant is determined to be at a second proximity further than the first proximity with respect to the light fixture.

5. The system of claim 4, wherein the processor is configured to provide a plurality of illumination intensity levels between a highest intensity level and a lowest intensity level, the plurality of illumination intensity levels corresponding to a plurality of proximities of the occupant sensed by the proximity sensor of the light fixture.

6. The system of claim 1, wherein the processor of the light fixture is configured to change an intensity of illumination provided by the illuminating element as a proximity of the occupant to the light fixture changes by controlling the driver circuitry to change the power provided to the illuminating element.

7. The system of claim 1, wherein the proximity sensor comprises at least one of an infrared (IR) sensor, an ultrasonic sensor, an audio sensor array, a radar sensors, a "time of flight" sensor, a distance-based photoelectric sensor, a radio frequency identification (RFID) tag reader, and a near field communication (NFC) tag reader.

8. The system of claim 1, wherein the proximity sensor comprises at least one of a Bluetooth radio, a Wi-Fi radio, and an ultra-wideband (UWB) radio,
wherein the Bluetooth radio or the Wi-Fi radio or the UWB radio is configured to detect a signal from a mobile device carried by the occupant, and
wherein a proximity of the occupant is sensed based on a detected signal from the mobile device.

9. The system of claim 1, wherein the processor in each light fixture of the plurality of independently controlled light fixtures is configured to control the driver circuitry to provide power to the illuminating element such that intensity of the illumination provided by each light fixture of the plurality of independently controlled light fixtures decreases as a proximity of the occupant to each light fixture sensed by the proximity sensor of each light fixture increases.

10. The system of claim 1, wherein the processor of each light fixture of the plurality of independently controlled light fixtures is configured to:
determine that the occupant within a first proximity of the light fixture is within a first range based on the signals received from the proximity sensor of the light fixture;

determine that the first range of the occupant is further from the light fixture than a second range closer to the light fixture than the first range at which the processor causes an intensity of the illumination to increase from a first intensity to a second intensity; and illuminate the light fixture at the first intensity based on the determined first range of the occupant.

11. A method for providing distributed lighting control with a plurality of independently controlled light fixtures, the method comprising:

receiving signals from one or more sensors of a light fixture of the independently controlled light fixtures; and providing power to an illuminating element of the light fixture by controlling driver circuitry of the light fixture via a processor of the light fixture to generate illumination based on the received signals from only a proximity sensor of the one or more sensors, wherein illumination provided by each light fixture of the plurality of independently controlled light fixtures is controlled independently of the illumination provided by other light fixtures of the plurality of independently controlled light fixtures, wherein a plurality of different levels of illumination are simultaneously provided by a plurality of subsets of light fixtures in the plurality of independently controlled light fixtures without control by a central controller based on a sensed proximity of an occupant individually sensed by each light fixture in each of the plurality of subsets of light fixtures, and wherein the plurality of different levels of illumination provide changing illumination as the occupant is sensed at further proximities with respect to each of the subsets of light fixtures by the one or more sensors of each of the plurality of independently controlled light fixtures in each of the subsets of light fixtures.

12. The method of claim 11, further comprising:

sensing a proximity of the occupant to each light fixture of the plurality of independently controlled light fixtures via the proximity sensor of each light fixture, and determining, by a processor of each light fixture, a range of the occupant with respect to the light fixture based on received signals from the proximity sensor.

13. The method of claim 12, further comprising:

generating illumination by each light fixture of the plurality of independently controlled light fixtures based on the determined range of the occupant with respect to each light fixture by controlling, via the processor of each light fixture, driver circuitry of each light fixture to provide power to an illuminating element of each light fixture.

14. The method of claim 11, further comprising:

generating illumination by each light fixture of the plurality of independently controlled light fixtures based on a proximity of the occupant to each light fixture by controlling driver circuitry of each light fixture, via a processor of each light fixture, to provide power to an illuminating element of each light fixture;

generating a first illumination having a first intensity when the occupant is determined to be at a first proximity with respect to the light fixture; and generating a second illumination having a second intensity less bright than the first intensity when the occupant is determined to be at a second proximity further than the first proximity with respect to the light fixture.

15. The method of claim 14, further comprising:

providing a plurality of illumination intensity levels between a highest intensity level and a lowest intensity level, the plurality of illumination intensity levels corresponding to a plurality of proximities of the occupant sensed by the proximity sensor of the light fixture.

16. The method of claim 11, further comprising:

changing an intensity of illumination provided by the illuminating element of the light fixture as a proximity of the occupant to the light fixture changes by controlling the driver circuitry of the light fixture via the processor of the light fixture to change the power provided to the illuminating element.

17. The method of claim 11, wherein the proximity sensor comprises at least one of an infrared (IR) sensor, an ultrasonic sensor, an audio sensor array, a radar sensor, a "time of flight" sensor, a distance-based photoelectric sensor, a radio frequency identification (RFID) tag reader, and a near field communication (NFC) tag reader.

18. The method of claim 11, wherein the proximity sensor comprises at least one of a Bluetooth radio, a Wi-Fi radio, and an ultra-wideband (UWB) radio, wherein the method further comprises detecting a signal via the Bluetooth radio or the Wi-Fi radio or the UWB radio from a mobile device carried by the occupant, and sensing a proximity of the occupant from each of the plurality of independently controlled light fixtures based on detecting the signal from the mobile device.

19. The method of claim 11, controlling driver circuitry of each light fixture of the plurality of independently controlled light fixtures, via a processor of each light fixture, to provide power to an illuminating element of each light fixture such that intensity of the illumination provided by each light fixture of the plurality of independently controlled light fixtures decreases as a proximity of the occupant to each light fixture sensed by one or more sensors of each light fixture increases.

20. The method of claim 11, further comprising:

determining, via the processor of the light fixture of the plurality of independently controlled light fixtures, based on the signals received from the proximity sensor of the light fixture, that the occupant within a first proximity of the light fixture is within a first range;

determining, via the processor, that the first range of the occupant is further from the light fixture than a second range closer to the light fixture than the first range at which the processor causes an intensity of the illumination to increase from a first intensity to a second intensity; and illuminating the light fixture at the first intensity based on the determined first range of the occupant.

21. A lighting system having distributed control, the lighting system, including:

a plurality of independently controlled light fixtures, each light fixture of the plurality of independently controlled light fixtures comprising:

an illuminating element;

driver circuitry operatively coupled to the illuminating element and configured to provide power to the illuminating element;

a proximity sensor; and a processor operatively coupled to the proximity sensor and the driver circuitry, the processor configured to:

receive signals from the proximity sensor; and control the driver circuitry to provide power to the illuminating element to generate one or more lighting characteristics based on the received signals from only the proximity sensor, wherein the one or more lighting characteristics provided by each light fixture of the plurality of independently controlled light fixtures are controlled independently of the one or more lighting characteristics provided by others of the plurality of independently controlled light fixtures, wherein the one or more lighting characteristics are simultaneously provided by a plurality of subsets of light fixtures in the plurality of independently controlled light fixtures without control by a central controller based on a sensed proximity of an occupant individually sensed by each light fixture in each of the plurality of subsets of light fixtures, and wherein varying degrees of the one or more lighting characteristics provide changing illumination as the occupant is sensed at further proximities with respect to each of the subsets of light fixtures by the proximity sensor of each of the plurality of independently controlled light fixtures in each of the subsets of light fixtures.

22. The system of claim 21, wherein the proximity sensor of each light fixture is configured to sense a proximity of the occupant to the light fixture, and the processor of the light fixture is configured to determine a range of the occupant with respect to the light fixture based on received signals from the proximity sensor.

23. The system of claim 22, wherein the processor of the light fixture is configured to control the driver circuitry to provide power to the illuminating element to generate the one or more lighting characteristics based on the determined range of the occupant with respect to the light fixture.

* * * * *